(12) United States Patent
Roth

(10) Patent No.: US 12,434,557 B2
(45) Date of Patent: Oct. 7, 2025

(54) CHARGING FLAP SYSTEM FOR ELECTRICALLY PROPELLED VEHICLES

(71) Applicant: Bayerische Motoren Werke Aktiengesellschaft, Munich (DE)

(72) Inventor: Thomas Roth, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 383 days.

(21) Appl. No.: 18/032,581

(22) PCT Filed: Oct. 15, 2021

(86) PCT No.: PCT/EP2021/078563
§ 371 (c)(1),
(2) Date: Apr. 19, 2023

(87) PCT Pub. No.: WO2022/089962
PCT Pub. Date: May 5, 2022

(65) Prior Publication Data
US 2023/0391186 A1  Dec. 7, 2023

(30) Foreign Application Priority Data

Oct. 27, 2020  (DE) .................. 10 2020 128 203.6

(51) Int. Cl.
*B60K 15/05* (2006.01)
*B60L 53/16* (2019.01)

(52) U.S. Cl.
CPC .............. *B60K 15/05* (2013.01); *B60L 53/16* (2019.02); *B60K 2015/053* (2013.01); *B60K 2015/0538* (2013.01); *B60K 2015/0561* (2013.01)

(58) Field of Classification Search
CPC ............ B60K 15/05; B60K 2015/0515; B60K 2015/053; B60K 2015/0538;
(Continued)

(56) References Cited

U.S. PATENT DOCUMENTS

| 5,501,607 A * | 3/1996 | Yoshioka | .............. E05D 11/105 220/259.2 |
| 2013/0196522 A1* | 8/2013 | Hara | ....................... B60L 53/16 439/136 |

(Continued)

FOREIGN PATENT DOCUMENTS

| DE | 10 2007 002 025 A1 | 7/2008 |
| DE | 10 2017 222 503 A1 | 6/2019 |
| EP | 2 865 559 A2 | 4/2015 |
| EP | 3 447 849 A1 | 2/2019 |

OTHER PUBLICATIONS

International Search Report (PCT/ISA/210) issued in PCT Application No. PCT/EP2021/078563 dated Jan. 12, 2022 with English translation (five (5) pages).

(Continued)

*Primary Examiner* — Gregory A Blankenship
(74) *Attorney, Agent, or Firm* — Crowell & Moring LLP

(57) ABSTRACT

A charging flap system for electrically propelled vehicles has a charging socket bracket and a charging socket fastened therein having an outer wall, an inner wall and a cavity therebetween, including a DC power connection, and a charging flap, which is connected for rotation via an articulation joint with a return spring to the charging socket bracket and covers the DC power connection in a first position and reveals the power connection in a second position. An undercut is arranged on the articulation joint. A retaining hook has a socket pin, the bottom of which can be displaced on the charging socket bracket and which includes a tip which points towards the DC power connection. The retaining hook has a joint pin, which is connected to an end region opposite the tip and leads away from the charging socket bracket at a predefined angle, wherein the free end of the joint pin has a retaining lug matching the undercut. A spring is arranged on the joint pin such that the joint pin is pressed towards the charging socket. A recess is arranged in (Continued)

the outer wall of the charging socket such that the tip of the socket pin can be guided through the recess. The undercut of the articulation joint and the retaining hook are arranged such that, in the closed state of the charging socket cover, the retaining lug bears on a region of the articulation joint, which does not have an undercut, such that the tip of the socket pin extends through the outer wall but not into the cavity, and, in the opened state of the charging socket cover, the undercut is arranged such that the retaining lug engages in the undercut and the tip of the socket pin extends into the cavity.

10 Claims, 3 Drawing Sheets

(58) Field of Classification Search
CPC .... B60K 2015/0561; B60K 2015/0576; B60K 2015/0584; B60K 2015/0546; H01R 1/4532; H01R 1/5213; B60L 53/16
USPC ...................................................... 296/97.22
See application file for complete search history.

(56) References Cited

U.S. PATENT DOCUMENTS

| | | | |
|---|---|---|---|
| 2018/0215254 A1* | 8/2018 | Jobst | H01R 13/447 |
| 2019/0267741 A1 | 8/2019 | Sawada et al. | |
| 2021/0071448 A1* | 3/2021 | Maeda | E05B 81/90 |
| 2023/0391186 A1* | 12/2023 | Roth | H01R 13/5213 |
| 2024/0133223 A1* | 4/2024 | Iwami | H01R 13/5213 |
| 2024/0136757 A1* | 4/2024 | Hirabayashi | B60L 53/16 |
| 2025/0058659 A1* | 2/2025 | Sun | B60L 53/11 |

OTHER PUBLICATIONS

German-language Written Opinion (PCT/ISA/237) issued in PCT Application No. PCT/EP2021/078563 dated Jan. 12, 2022 (six (6) pages).

German-language Search Report issued in German Application No. 10 2020 128 203.6 dated Jun. 30, 2021 with partial English translation (10 pages).

\* cited by examiner

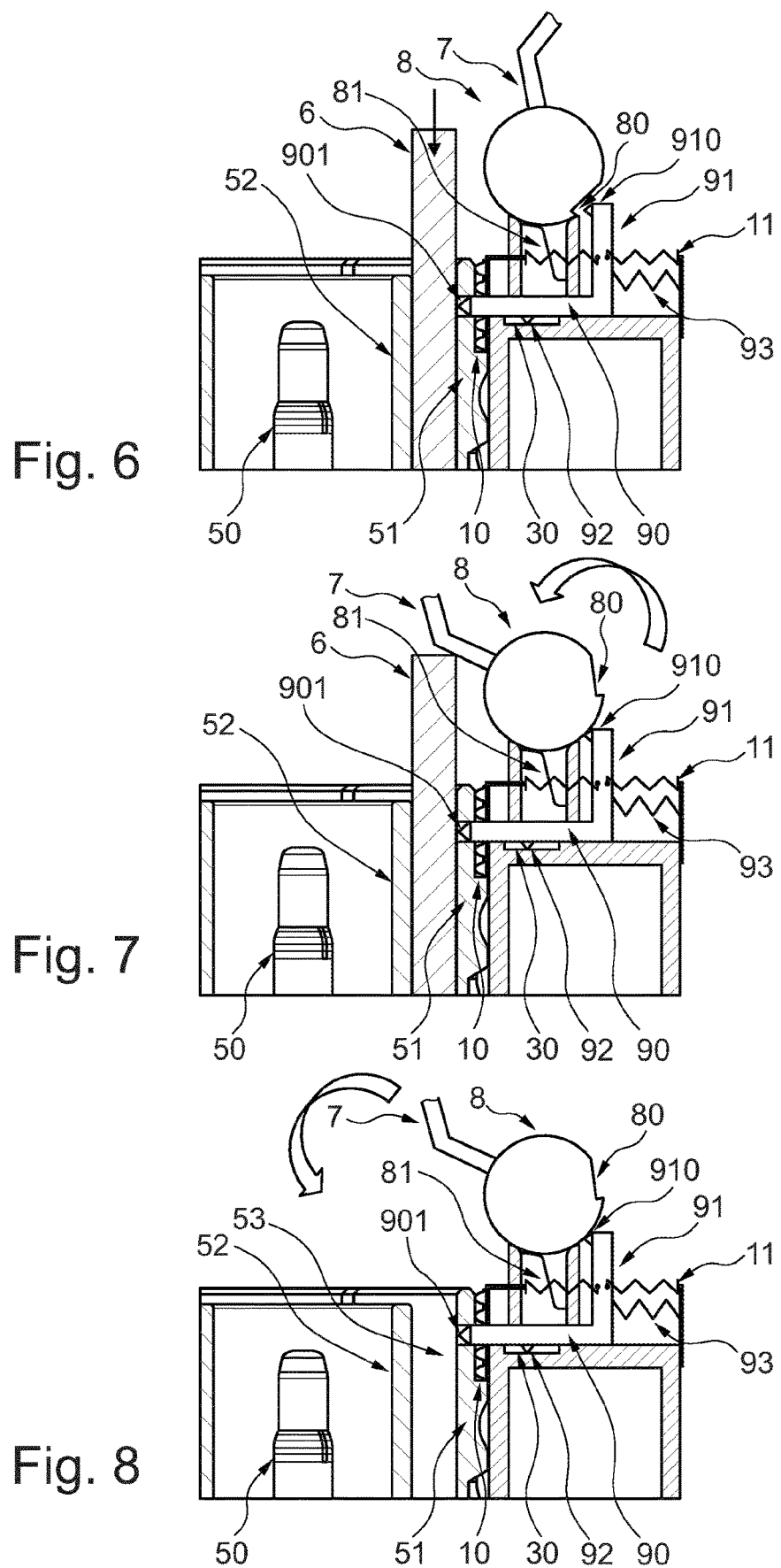

CHARGING FLAP SYSTEM FOR ELECTRICALLY PROPELLED VEHICLES

BACKGROUND AND SUMMARY

The invention relates to a charging flap system for electrically propelled vehicles.

An electrically propelled vehicle is, for example, an electric or hybrid vehicle, which has an energy store formed as a high-voltage store and an electric motor for propelling the vehicle. The electrical energy store of the vehicle is charged via a special charging socket, which has an alternating current (AC) connection and/or a direct current (DC) connection. The charging socket is arranged in a charging socket bracket, which is arranged in what is known as the charging flap system and behind an opening in the outer skin of the vehicle. When not being used, both charging sockets are closed by a cover fixed to the outer skin of the vehicle. In addition, at least the DC charging socket is covered by a charging socket cover, which serves both as a contact protector and as a corrosion preventive.

If fast charging is to be carried out, that is charging with direct current (DC charging), both the tank cover and the charging flap, that is to say the DC charging socket cover, are opened. Thus, a charging plug can be connected to the charging socket and the charging operation can be carried out.

This means that during DC charging, two coverings have to be removed by the user and attached again after the charging operation. In order to permit more convenient charging, DE 10 2017 222 503 A1 proposes a displaceable contact protector, which can be moved both manually and also by means of an electric drive.

It is an object of the invention to configure the charging operation to be still more convenient for the user. According to the invention, this object is achieved by the features of the independent patent claims. Advantageous refinements are the subject matter of the dependent claims.

A charging flap system for electrically propelled vehicles is proposed, having a charging socket bracket and a charging socket fixed therein having an outer wall, an inner wall and a cavity lying between them, having at least one DC power connection and a charging flap, which is rotatably connected via a rotary joint to a return spring on the charging socket bracket and covers the DC power connection in a first position and reveals the same in a second position. Also provided is an undercut arranged on the rotary joint, and a retaining hook. The latter has a socket pin, the underside of which is displaceable on the charging socket bracket and which has a tip, which points in the direction of the DC power connection. The retaining hook moreover has a joint pin, which is connected to an end region opposite the tip and leads away from the charging socket bracket at a predefined angle, wherein the free end of the joint pin has a retaining lug corresponding to the undercut. Furthermore, a spring is arranged on the joint pin in such a way that the joint pin is pressed in the direction of the charging socket. In addition, a recess in arranged in the outer wall of the charging socket in such a way that the tip of the socket pin can be guided through the latter. The undercut of the rotary joint and the retaining hook are arranged in such a way that, when the charging socket cover is closed, the retaining lug rests on a region of the rotary joint which has no undercut, in such a way that the tip of the socket pin reaches through the outer wall but not into the cavity and, when the charging socket cover is opened, the undercut is arranged in such a way that the retaining lug engages in the latter and the tip of the socket pin reaches into the cavity.

As a result of the combination of the features comprising the undercut on the rotary joint, the retaining hook with retaining lug for the engagement into the undercut and the tip which, when the charging socket cover is opened, reaches through the recess into the charging socket, the closure of the charging socket cover can be carried out automatically. This is achieved in that, when the charging plug is inserted into the charging socket, i.e. into the cavity into which the tip reaches when the charging socket cover is opened, the tip is pressed out of the cavity by the charging plug, counter to the spring force. As a result, the retaining lug is released from the undercut and the rotary joint with the charging socket cover is moved in the direction of the closed position. The charging socket cover is prevented from closing completely by the charging plug. However, as soon as the charging plug is withdrawn, the charging socket cover closes because of the spring provided on the rotary joint, which is likewise designed in such a way that the rotary joint is intended to move the charging socket cover into a closed position.

Furthermore, provision is made for the joint pin to be formed from an elastically deformable material. Thus, protection is provided against breakage of the joint pin under the action of too high a force.

Furthermore, provision is made for a sealing element to be provided between the charging socket bracket and the outer wall of the DC charging socket, in such a way that the surroundings of the recess are sealed off therefrom. Furthermore, provision is made for a sealing element to be provided in the region of the retaining hook in such a way that it seals off the spring and the socket pin with respect to the outside. Sealing elements are used to protect components against external influences and therefore increase the lifetime of the component.

Furthermore, provision is made to provide an assembly hook on the underside of the socket pin and a recess in the charging socket bracket, in which the assembly hook is guided after it has been assembled. In one embodiment, for assembly the assembly hook is arranged outside the recess in an assembly recess, which is arranged in a region of the recess that faces away from the charging socket. By means of the assembly hook, the retaining hook is retained in a predefined position for the assembly, which makes assembly easier. After the assembly has been completed, the assembly hook is no longer needed and can be used as a guide element in the recess provided for the purpose. The recess should be provided in such a way that the assembly hook does not hinder the movement of the socket pin.

Furthermore, provision is made for the charging socket to be a combination charging socket, having an AC charging socket and a DC charging socket, the charging socket cover being provided for the DC charging socket and/or for the AC charging socket. The proposed charging socket cover can be used for different charging socket covers. As a rule, only the DC charging socket is covered by a charging socket cover, no matter in which design.

Furthermore, provision is made for the charging socket cover to be arranged laterally beside the associated charging socket. Thus, less space is needed, since the charging socket is arranged and moved in a manner corresponding to the tank cover.

Furthermore, provision is made for the charging flap system to have a tank cover, which is arranged in such a way that it covers the charging flap system when it is closed. The tank cover is used both to cover a charging socket that is not covered by a charging socket cover, which as a rule will be the AC charging socket, but also to be matched visually to the external appearance of the vehicle.

Furthermore, a vehicle having the above-described charging flap system is proposed.

Further features and advantages of the invention can be gathered from the following description of exemplary embodiments of the invention, with reference to the figures of the drawing, which shows details according to the invention, and from the claims. The individual features can each be implemented on their own or in a plurality in any desired combination in a variant of the invention.

Preferred embodiments of the invention will be explained in more detail below with reference to the appended drawings.

BRIEF DESCRIPTION OF THE DRAWINGS

FIGS. 2 to 8 are sectional illustrations of the charging flap system with different positions of the charging socket cover according to one embodiment of the present invention.

DETAILED DESCRIPTION OF THE DRAWINGS

In the following figure descriptions, the same elements and functions are provided with the same designations.

Figure 1:
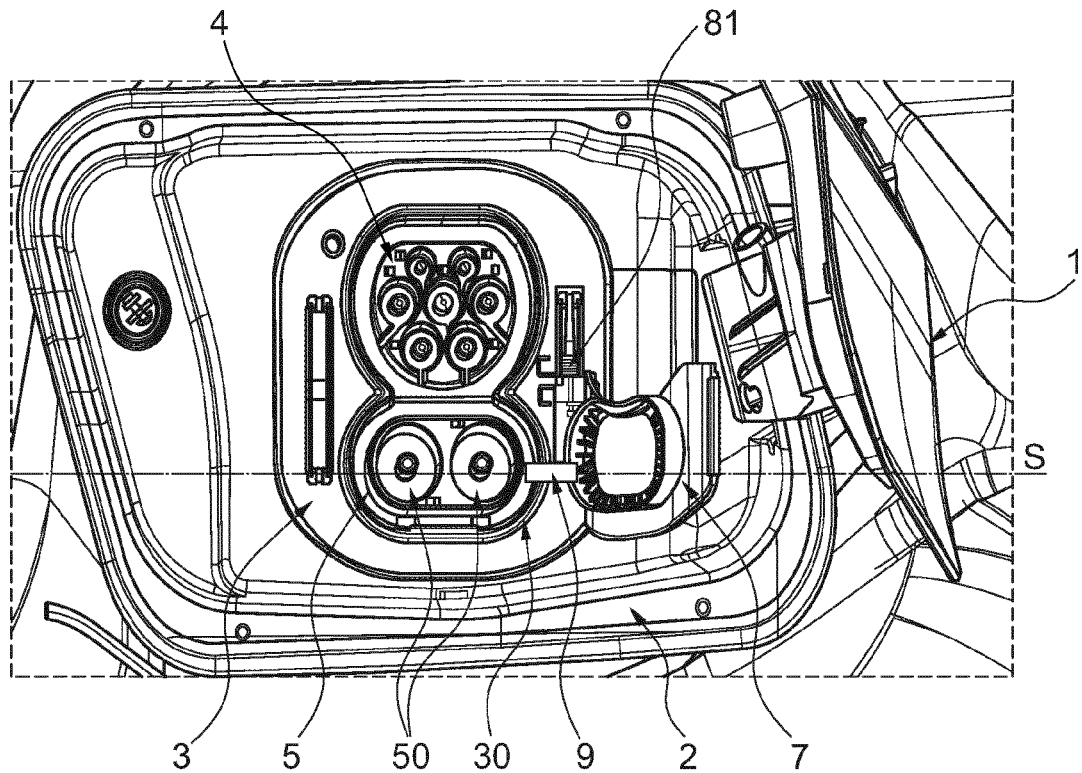
FIG. 1 is an illustration of a charging flap system having a combination charging socket with an AC and DC power connection according to one embodiment of the present invention.

The basic concept of the invention is to provide automatic closure of the charging socket cover 7 of a charging flap system for electrically propelled vehicles after a charging operation has been carried out. Both only a single charging socket (AC or DC) with a charging flap or a combination charging socket, that is to say a charging socket with an AC charging socket 4 and a DC charging socket 5, can be present, as shown in FIG. 1.

As already described at the beginning, charging of the electric energy store of a vehicle is carried out via a special charging socket, which has an alternating current connection or an AC charging socket 4 and/or a DC current connection or a DC charging socket 5. The charging socket is arranged in what is known as a charging socket bracket 3 which is arranged in the so-called charging flap system and behind an opening in the outer skin of the vehicle, as shown in FIG. 1. When not being used, both charging sockets 4, 5 are closed by a tank cover 1 fixed to the outer skin of the vehicle. In addition, at least the DC charging socket 5 is covered by a charging socket cover 7, which serves both as a contact protector and as a corrosion preventive. The charging socket cover 7 is designed as a hinged cover, is therefore moved via a rotary joint 8. AC charging sockets 4 do not necessarily have to be covered by a charging socket cover. For fast electrical charging, that is to say DC charging, the tank cover 1 and charging socket cover 7 are opened. Only then can the charging plug 6 be inserted into the cavity 53 between the outer wall 51 and inner wall 52 of the charging socket and the charging operation be started.

Since, as a rule, only the DC charging socket 5 is provided with a charging socket cover, the invention will be described below with reference to a charging socket cover 7 arranged on the DC charging socket 5. However, the charging socket cover can also be provided on an AC charging socket 4 or on both charging sockets 4, 5.

In order to provide automatic closure of the charging socket cover 7 after a charging operation has been completed, the mechanical solution described below in FIGS. 2 to 8 with reference to the sectional views through section plane S (see FIG. 1) is proposed.

Figure 2:
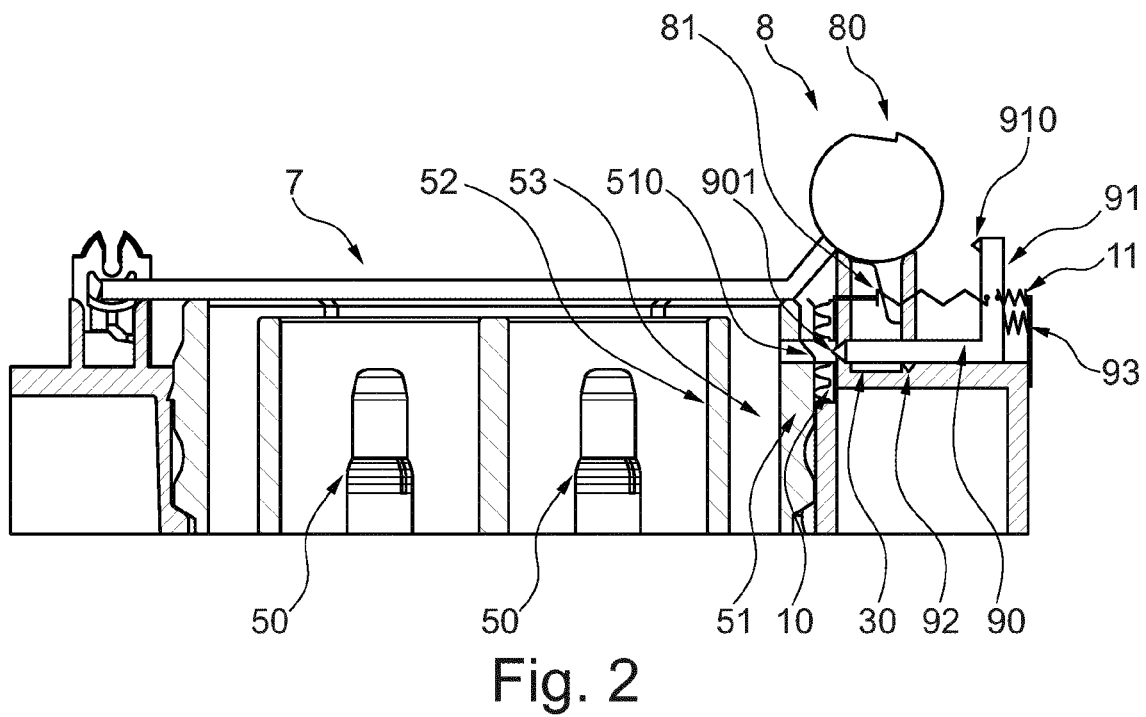

In FIG. 2, an assembly position is shown, the DC charging socket 5 having already been introduced into the charging socket 3 bracket and been fixed. The charging socket cover 7 is closed, therefore conceals the DC charging socket 5, more precisely its electric pins 50. The charging socket cover 7 is movable via a rotary joint 8 from a closed position to an open position and vice versa. The rotary joint 8 has a return spring 81, which is designed in such a way that the rotary joint 8 wishes to move or moves the charging socket cover 7 always into the closed position (as far as possible, as will be disclosed later). In addition, in a defined region of the rotary joint 8, the latter has an undercut 80, in which the retaining lug 910, described below, of the retaining hook 9 can be brought into engagement in order to permit the automatic closure of the charging socket cover 7 in interplay with the retaining hook 9. The mode of action will be described after the description of design features.

The previously mentioned retaining hook 9 is substantially L-shaped, wherein one leg, designated as socket pin 90 below, rests displaceably on the charging socket 3 bracket or is arranged at a distance therefrom, i.e. substantially parallel thereto, and the other leg, designated as a joint pin 91 below, projects away from the charging socket bracket 3 at an angle which is advantageously substantially 90 degrees. The angle results from the lengths of the two legs 90, 91, as will become obvious from the following description of the action. The socket pin 90 has a tip 901 in its upper or exposed end region, which points in the direction of the DC charging socket 5. In its upper or exposed end region, the joint pin 91 has a retaining lug 910, which is shaped and arranged in such a way that, in a predefined position of the rotary joint 8, it is in engagement with the undercut 80 of the latter and prevents the rotary joint 8 from rotating.

Additionally provided is a spring 93, which is fixed at one end to the joint pin 91 and at the other end to a fixing which, for example, is connected to the charging socket bracket 3. This spring 93 is selected in such a way that it presses the joint pin 91 and therefore also the socket pin 90 always in the direction of the charging socket 5.

In its outer wall 51, the DC charging socket 5 has a recess 510, which is arranged in a manner corresponding to the socket pin 90, that is to say is arranged in such a way that the socket pin 90 can push through the recess 510 (because of the spring force acting from the spring 93). The recess 510 is therefore formed to be at least as large as the socket pin 90, so that the latter easily fits through the recess 510.

In addition, in one embodiment, a sealing element 10, which offers protection against external influences such as wet and soiling, is arranged around the recess 510 of the outer wall 51.

In addition, a further sealing element 11 can be provided, which is arranged above the spring 93 on the joint pin 91 and protects the spring 93 and socket pin 90 against external influences. This sealing element 11 can be formed, for example, as a bellows.

As already mentioned above, FIG. 2 shows an assembly position, in which the device is assembled, therefore not yet ready for use. In this position, the retaining hook 9 is retained in a position in which it does not yet interact with the charging socket. This is achieved by a retaining means being provided on the underside of the socket pin 90, for example in the form of an assembly hook 92, which projects from the underside of the socket pin 90 and engages in an assembly recess in the charging socket bracket 3. Thus, despite the spring force of the spring 93 acting thereon in the direction of the charging socket, the retaining hook 9 is retained in its position. Alternative solutions are conceivable in order to retain the retaining hook 9 in its position for the assembly, for example the spring 93 can only be assembled at a predefined time or can be fixed to both ends.

Figure 3:
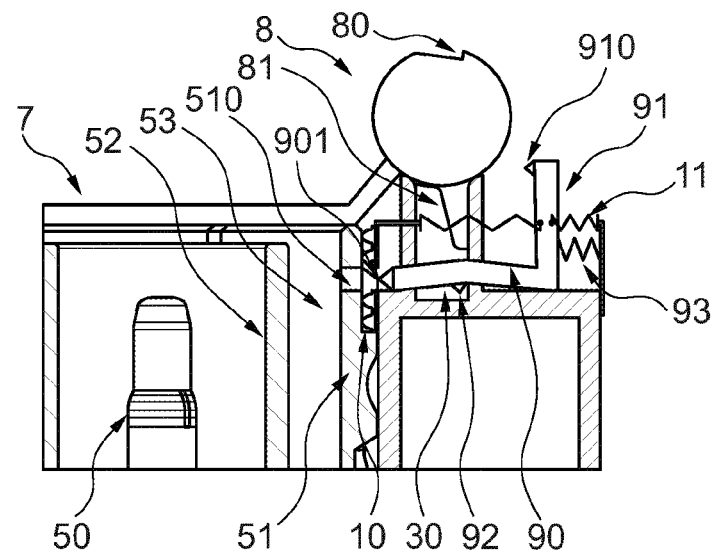

In order to make the device ready for use, the retaining hook 9 is pressed or pushed in the direction of the charging socket, being elastically deformed as a result and the assembly hook 92 being pressed out of the assembly recess, as illustrated in FIG. 3. Therefore, the spring 93 can develop its action and press the retaining hook 9, more precisely the socket pin 90, in the direction of the charging socket 5. Advantageously, in the event that an assembly hook 92 is provided, a further recess 30 is provided in the charging socket bracket 3, being located in the region between the assembly recess for the assembly hook 92 and the end region of the charging socket bracket 3 in the direction of the charging socket. This recess 30 has a length such that the assembly hook 92 can be displaced therein unimpededly, that is to say it does not block the socket pin 90. The assembly recess is therefore arranged in such a way that it is located in a region of the recess 30 that faces away from the charging socket 5.

Figure 4:
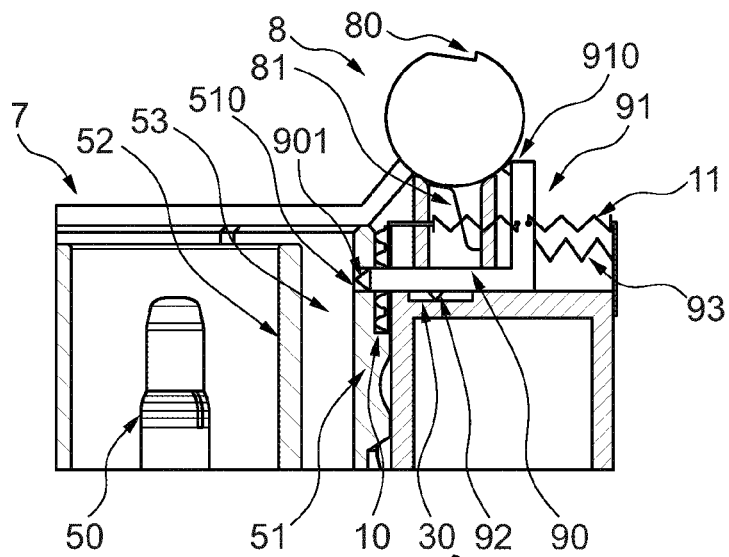

FIG. 4 illustrates the device ready to use. Here, it can be seen that the assembly hook 92 is located within the recess 30, the tip 901 of the nozzle pin 90 already pushes through the outer wall 51 of the DC charging socket 5 but is not yet located in the cavity 53. The joint pin 91 strikes the rotary joint 8, the undercut 80 still being in a rest position, since the charging socket cover 7 is closed. The penetration of the socket pin 90 into the cavity 93 is therefore prevented by the joint pin 91, even if the spring force of the spring 93 acts in the direction of the DC charging socket 5 and would press the socket pin 90 into the cavity 53.

Figure 5:
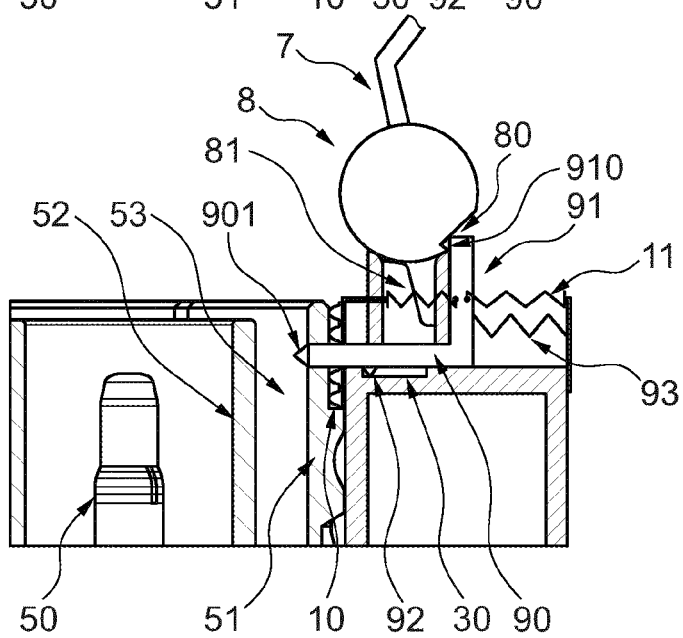

An open position of the charging socket cover 7 is shown in FIG. 5. Here, it can be seen that as a result of the rotation of the rotary joint 8 into the open position of the charging socket cover 7, the undercut 80 is rotated in the direction of the joint pin 91 and, in the (completely) opened position, the retaining lug 910 of the joint pin 91 is in engagement with the undercut 80 of the rotary joint 8 and therefore fixes the latter, more precisely preloads its return spring 81, which wishes to move the charging socket cover 7 back into the closed position. As a result of the engagement in the undercut 80, the joint pin 91 is pressed a small amount further in the direction of the DC charging socket 5 by the spring 93, so that the socket pin 90 or its tip 901 is now pushed into the cavity 53 and projects into the latter. The undercut 80 is arranged on the rotary joint 8 such that, in a completely opened position of the charging socket cover 7, the retaining lug 910 is in engagement with the latter and prevents the rotary joint 8 from rotating.

If, then, as shown in FIG. 6, a charging plug 6 is inserted into the DC charging socket 5, more precisely into the cavity 53 between its outer wall 51 and inner wall 52, the charging plug presses on the tip 901 of the socket pin 90 and pushes the socket pin 90 back through the recess 510 counter to the spring force of the spring 93. The retaining lug 910 is likewise pushed rearwards and as a result releases the undercut 80. Since the return spring 81 of the rotary joint 8 always wishes to move the charging socket cover 7 into the closed position, the rotary joint therefore rotates until the charging socket cover 7 rests on the charging plug 6, as shown in FIG. 7. When the charging plug 6 is removed, the charging socket cover 6 closes automatically because of the force which the return spring 81 continues to exert thereon, as indicated by the arrow in FIG. 8.

In one embodiment, the tip 901 is flattened, at least in its upper region on which the charging plug 6 acts as it is inserted, so that less force has to be exerted by the charging plug to move the socket pin 90.

During manual closure, that is to say without a charging plug 6 being inserted, the undercut 80 is pressed against the retaining lug 910 and therefore counter to the spring force of the spring 93 by pressing the charging socket cover 7 closed. This may be sufficient to release the undercut 80 from the retaining lug 910 and to close the charging socket cover 9 without causing any damage to the retaining hook 9. In order to minimize this risk further, in one embodiment the joint pin 91 is formed from elastically deformable material. This has the advantage that, during manual closure, be it by pressing on the charging socket cover 7 or by closing the tank cover 1 and therefore pressing on the charging socket cover 7, the joint pin 91 is merely deformed but cannot break off even if the force acting is high.

In one embodiment, the charging socket cover 7 is fastened to the charging socket bracket 3 in such a way that it is opened in the same direction or in the opposite direction to the tank cover 1. Advantageously, its fastening is arranged on the left or right of the charging socket or sockets 4 and 5, that is to say at 9 o'clock or 3 o'clock, so that it does not open upwards or downwards, as in previously known charging flaps.

As opposed to previously known charging socket covers 7, the charging socket cover 7 proposed is fixed to the charging socket bracket 3, not to the charging socket 4 or 5 itself.

LIST OF DESIGNATIONS

1 Tank cover
2 Charging flap system
3 Charging socket bracket
30 Recess in charging socket bracket
4 AC power connection, AC charging socket
5 DC power connection, DC charging socket
50 Pins of DC charging socket
51 Outer wall of charging socket, wall between charging socket bracket and DC charging socket
510 Recess in wall of DC charging socket
52 Inner wall
53 Cavity
6 Charging plug
7 Charging socket cover of DC charging socket
8 Rotary joint
80 Undercut in rotary joint
81 Return spring in rotary joint
9 Retaining hook
90 Socket pin retaining hook
901 Tip of socket pin
91 Joint pin of retaining hook
910 Retaining lug in end region of joint pin
92 Assembly hook
93 Spring
10 Sealing element belonging to DC charging socket
11 Sealing element of retaining hook
S Section plane

The invention claimed is:
1. A charging flap system for electrically propelled vehicles, comprising:
  a charging socket bracket;
  a charging socket fixed in the charging socket bracket and having an outer wall, an inner wall and a cavity located between the outer wall and the inner wall, the charging socket comprising at least one DC charging socket;

a charging socket cover, which is rotatably connected to the charging socket bracket via a rotary joint having a return spring and covers the DC charging socket in a first position and exposes the DC charging socket in a second position;

an undercut arranged on the rotary joint;

a retaining hook, wherein the retaining hook comprises:
(i) a socket pin, an underside of which is displaceable on the charging socket bracket and which has a tip which points in a direction of the DC charging socket, and
(ii) a joint pin, which is connected to an end region opposite the tip and leads away from the charging socket bracket at a predefined angle, wherein a free end of the joint pin has a retaining lug corresponding to the undercut;

a spring, which is arranged on the joint pin such that the joint pin is pressed in the direction of the charging socket;

a recess in the outer wall of the charging socket, which is arranged such that the tip of the socket pin is guidable through the recess, wherein the undercut of the rotary joint and the retaining hook are arranged such that
(i) when the charging socket cover is closed, the retaining lug rests on a region of the rotary joint which has no undercut such that the tip of the socket pin reaches through the outer wall but not into the cavity, and
(ii) when the charging socket cover is opened, the undercut is arranged such that the retaining lug engages in the undercut and the tip of the socket pin reaches into the cavity.

2. The charging flap system according to claim 1, wherein the joint pin is formed of an elastically deformable material.

3. The charging flap system according to claim 1, further comprising:
a sealing element provided between the charging socket bracket and the outer wall of the DC charging socket such that surroundings of the recess are sealed off.

4. The charging flap system according to claim 1, further comprising:
a sealing element provided in a region of the retaining hook such that the sealing element seals off the spring and the socket pin from an outside area.

5. The charging flap system according to claim 1, further comprising:
an assembly hook on an underside of the socket pin, and
a recess in the charging socket bracket, in which recess the assembly hook is guided after the socket bracket has been assembled.

6. The charging flap system according to claim 5, wherein, for assembly, the assembly hook is arranged outside the recess in an assembly recess, which assembly recess is arranged in a region of the recess that faces away from the charging socket.

7. The charging flap system according to claim 1, wherein
the charging socket is a combined charging socket comprising an AC charging socket and the DC charging socket, and
the charging socket cover is provided for the DC charging socket and/or for the AC charging socket.

8. The charging flap system according to claim 1, wherein the charging socket cover is arranged laterally beside the associated charging socket.

9. The charging flap system according to claim 1, further comprising:
a further cover, which is arranged such that the further cover covers the charging flap system when in the closed position.

10. An electrically propelled vehicle comprising the charging flap system according to claim 1.

* * * * *